(12) United States Patent
Lee

(10) Patent No.: US 6,254,348 B1
(45) Date of Patent: Jul. 3, 2001

(54) STRUCTURE OF A RADIATING FAN

(76) Inventor: Richard Lee, No. 21, Alley 9, Lane 27, Sec. 5, Min Sheng E. Rd., Taipei (TW)

( * ) Notice: Subject to any disclaimer, the term of this patent is extended or adjusted under 35 U.S.C. 154(b) by 0 days.

(21) Appl. No.: 09/296,429

(22) Filed: Apr. 19, 1999

(51) Int. Cl.[7] .................................................. B63H 1/00
(52) U.S. Cl. ............................................. 416/174; 415/229
(58) Field of Search .............................. 416/174, 244 R, 416/204 R; 415/216.1, 229, 220, 223; 384/913, 907.1, 291, 297

(56) References Cited

U.S. PATENT DOCUMENTS

| | | | |
|---|---|---|---|
| 2,729,522 | * | 1/1956 | Bechler ................................. 384/291 |
| 3,022,685 | * | 2/1962 | Armacost .......................... 384/291 X |
| 3,023,059 | * | 2/1962 | Kirk ................................ 384/907.1 X |
| 4,541,786 | * | 9/1985 | McLean ........................ 416/241 B X |
| 4,962,734 | * | 10/1990 | Jorgensen .......................... 417/356 X |
| 4,975,925 | * | 12/1990 | Derrickson .............................. 372/58 |
| 5,380,112 | * | 1/1995 | Schicktanz et al. .......... 384/907.1 X |
| 5,738,446 | * | 4/1998 | Ghosh et al. ..................... 384/913 X |

* cited by examiner

*Primary Examiner*—John E. Ryznic
(74) *Attorney, Agent, or Firm*—Rosenberg, Klein & Lee

(57) ABSTRACT

An improved structure of a radiating fan comprises a blade seat, an axle center and a bearing. The central portion of the blade seat is installed with the axle center made of precision ceramic material, the outer peripheral surface of the axle center is covered by a hollow bearing made of precision ceramic material. Since the axle center and the bearing made of precision ceramic material have the advantages of long lifetime, low noise, and without using lubricating oil. Thus it is better than the axle center made of stainless steel and the oil bearing made of copper.

5 Claims, 5 Drawing Sheets

STRUCTURE OF A RADIATING FAN

BACKGROUND OF THE INVENTION

1. Field of the Invention

The present invention relates to an improved structure of a radiating fan, and especially to a radiating fan, wherein the axle center and the bearing thereof are made of precision ceramic material.

2. Background of the Invention

The prior art radiating fan had an axle center made of stainless material with a largest hardness of HK800. The oil bearing is made of copper so that the radiating fan has a lifetime of about 10000 hours. However, this prior art design is not suitable in the current day. Thus, ball bearings made of stainless steel or bearing steel and having a lifetime of 50000~60000 hours are used, but these bearings emit a large noise. Furthermore, the lifetimes of aforesaid two bearings will decrease rapidly with the increase of temperature. Thus, there is an eager demand for a novel bearing which can improve the defect in the prior art.

SUMMARY OF THE INVENTION

Accordingly, the object of the present invention is to provide an improved structure of a radiating fan providing a bearing and an axle center made of precision ceramic material. They have the advantages of long lifetime, low noise, and without using lubricating oil. Thus it is better than the axle center made of stainless steel and the oil bearing made of copper.

Another object of the present invention is to provide an improved structure of a radiating fan, wherein the contact area between the bearing and the axle center are reduce and therefore the sliding friction is decreased.

The present invention will be better understood and its numerous objects and advantages will become apparent to those skilled in the art by referencing to the following drawings in which:

DETAILED DESCRIPTION OF THE PREFERRED EMBODIMENT

With reference to FIGS. 1 to 8, the improved structure of a radiating fan according to the present invention is illustrated. The improved structure of a radiating fan includes a blade seat 1, an axle center 2, a bearing 3, etc.

Figure 1:
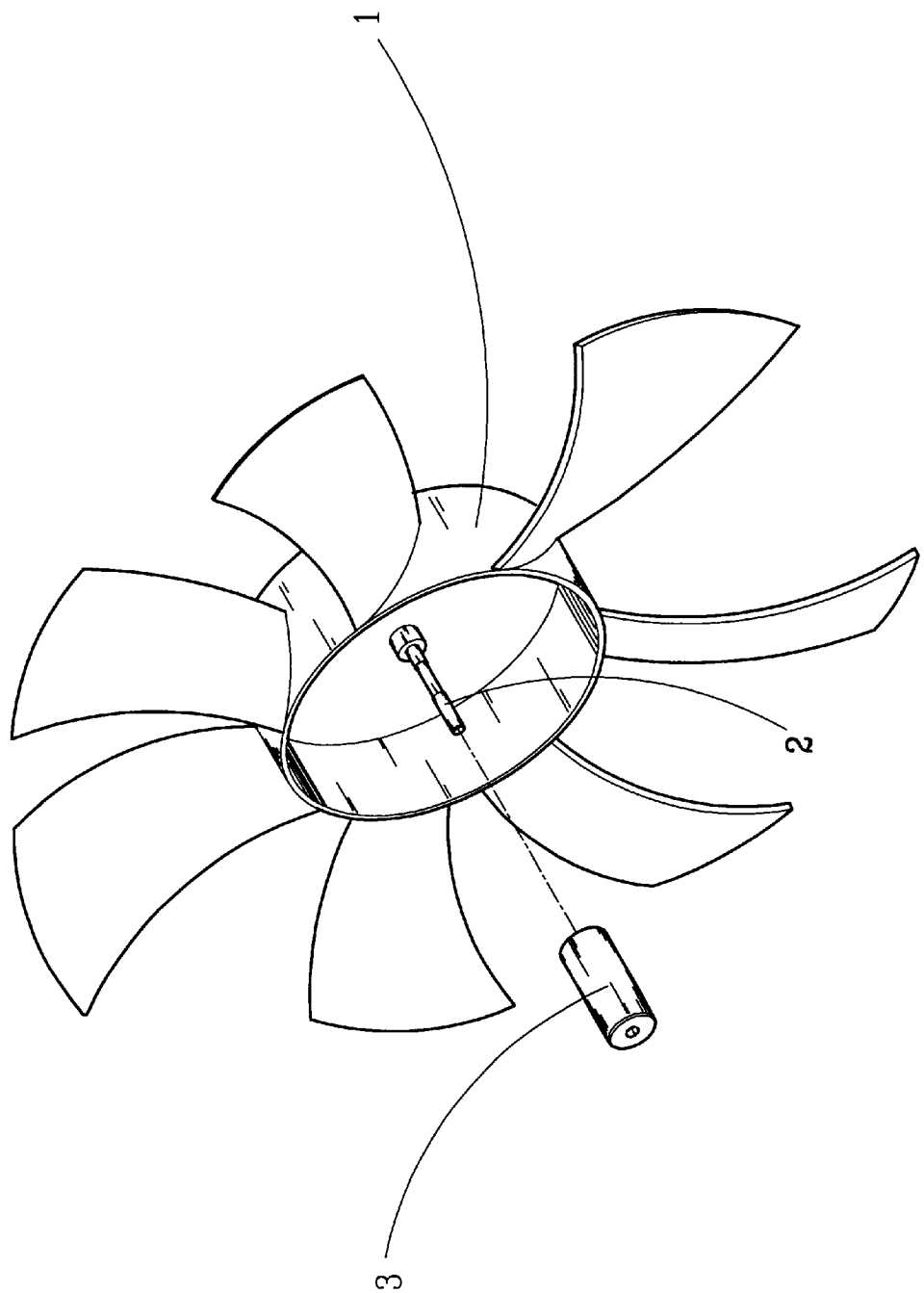
FIG. 1 is an exploded view of the present invention.
Figure 2:
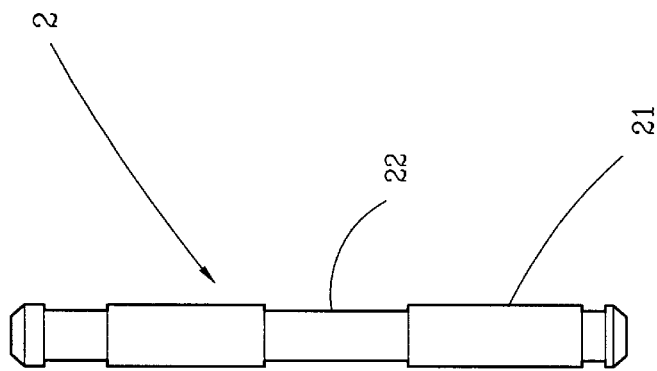
FIG. 2 shows the outlook of the axle center in FIG. 1.
Figure 3:
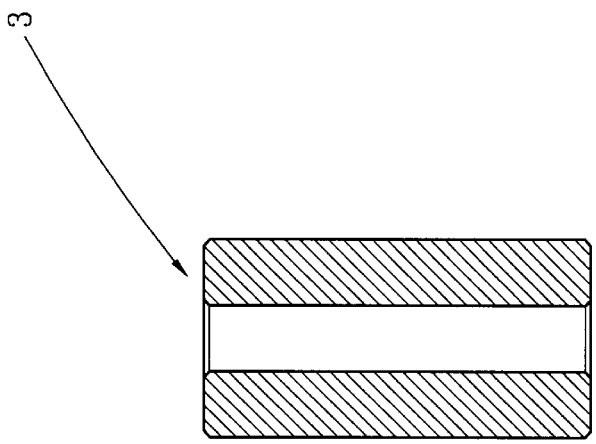
FIG. 3 shows the cross sectional view of the bearing in FIG. 1.
Figure 4:
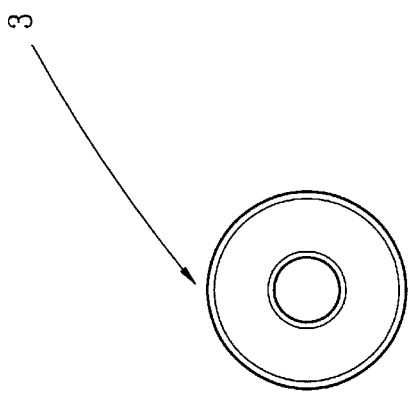
FIG. 4 is an upper view of the bearing in FIG. 1.
Figure 5:
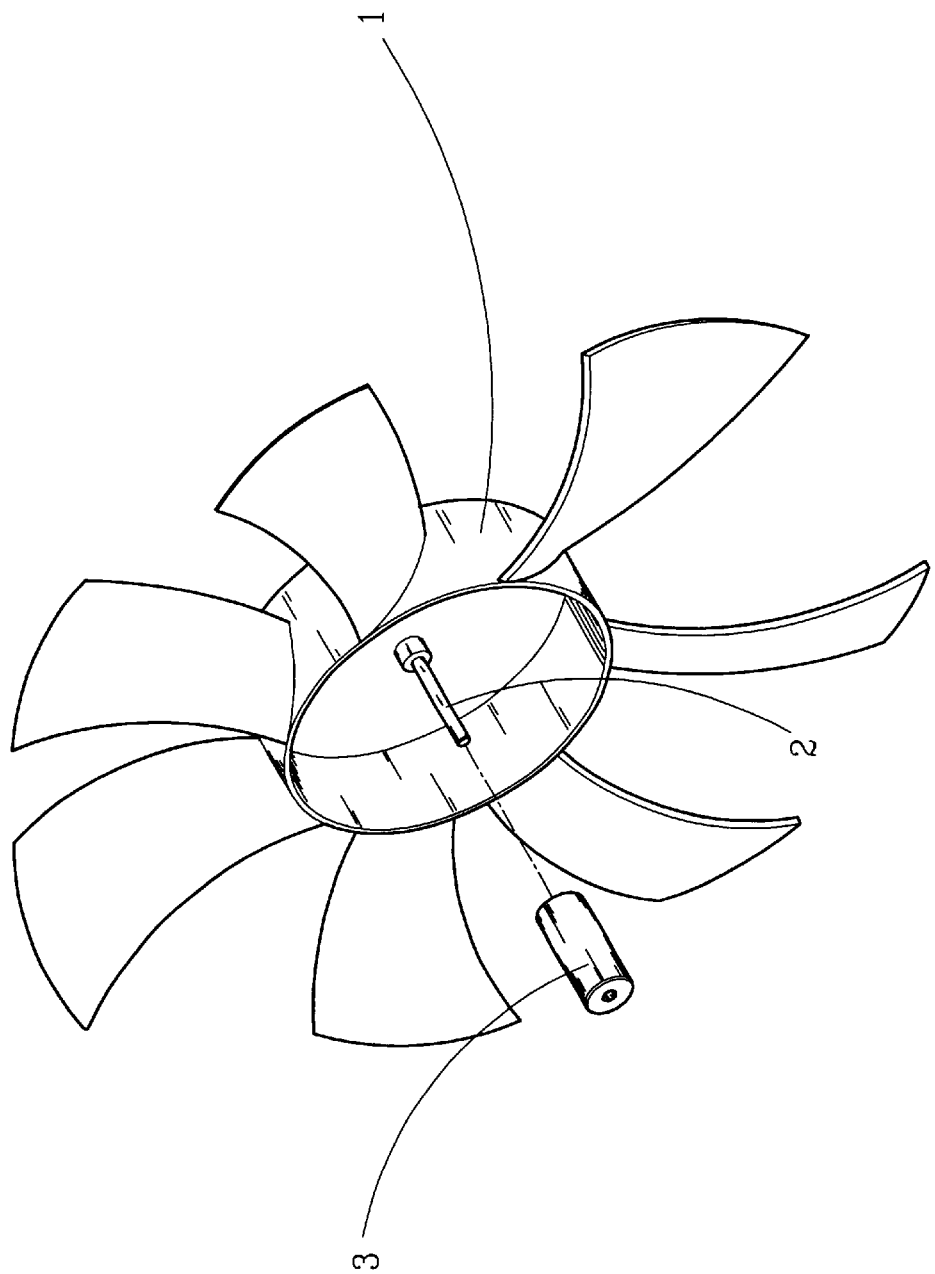
FIG. 5 is an exploded view of another embodiment of the present invention.
Figure 6:
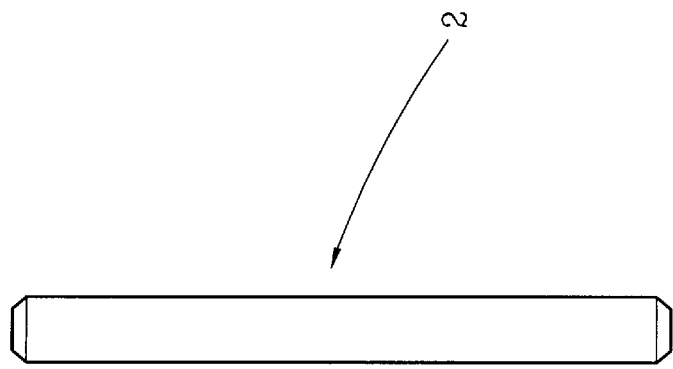
FIG. 6 shows the outlook of the axle center in FIG. 5.
Figure 7:
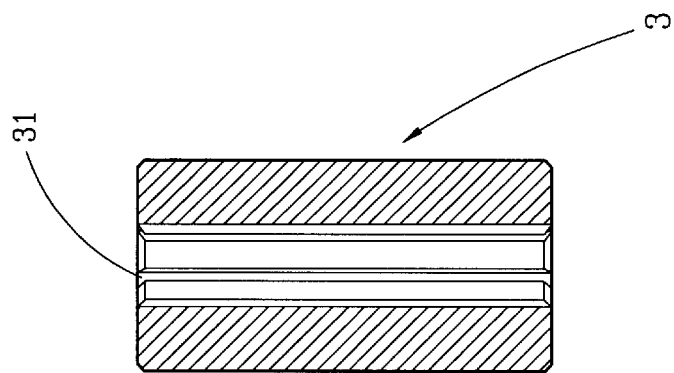
FIG. 7 shows the cross sectional view of the bearing in FIG. 5.

The center of the blade seat 1 is installed with an axle center 2 made of precision ceramic material. The outer peripheral surface 21 of the axle center 2 is circularly installed at least one groove 22. As shown in FIG. 2, when the hollow bearing 3 covers the axle center 2, the contact area therebetween is reduced and the friction force therebetween is also decreased.

Figure 8:
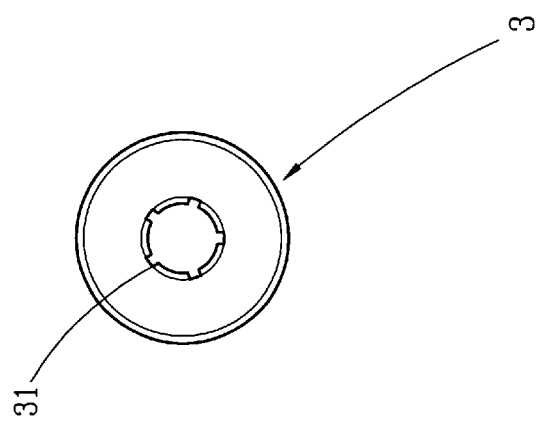
FIG. 8 is an upper view of the bearing in FIG. 5.
Figure 9:
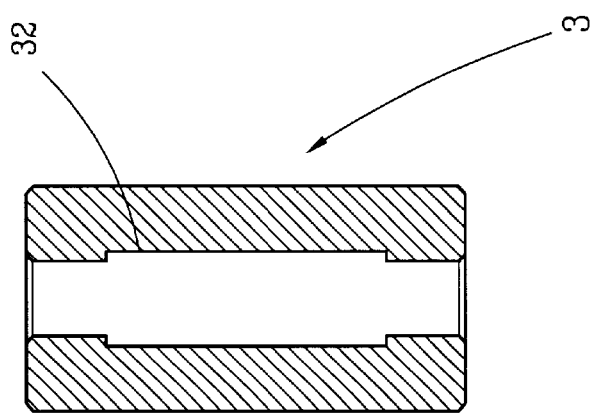
FIG. 9 is another cross sectional view of the bearing according to the present invention.
Figure 10:
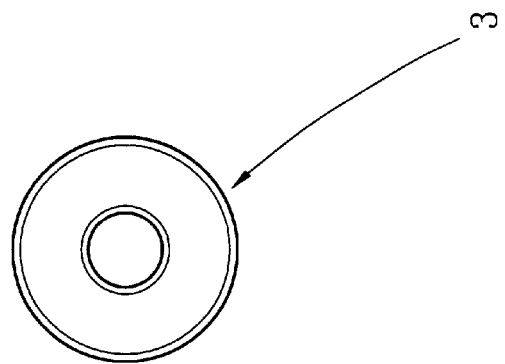
FIG. 10 is an upper view of FIG. 9.

The bearing 3 is formed by precision ceramic material, a plurality of radial guide trenches 31 are circularly installed on the inner peripheral surface thereof, as shown in FIG. 8, or a groove 32 is circularly installed on the inner peripheral surface of the bearing 3. When the bearing 3 contacts with the axle center 2, the contact area and the friction force are further decreased.

The axle center 2 and the bearing 3 have the following features:

1) Long lifetime:
   Hardness: above HK1200;
   Lifetime: at least 500000 hours;
   Wearing ability: seven times of stainless steel material;
2) Self lubrication (without using rubricating oil)
3) The expansion coefficient ($8 \times 10/°$ C.) is lower than that of stainless steel ($16 \times 10/°$ C.). That is, the lower the expansion coefficient, the difficult the variation in the size and geometry, thus the abnormal wearing between the axle center and the bearing is reduced.
4) Low noise (reduce 2~3 decibel)
5) The weight thereof is only about one half of those of the stainless steel and copper.

The axle center made of stainless steel is preferred than the oil bearing made of copper. By the improvement of the axle center 2 and the bearing 3, the contact area and therefore the friction force are reduced.

In summary, by the improved structure of a radiating fan according to the present invention, the lifetime of the radiating fan is increased, and the noise is reduced without using lubricating oil. Another, the present invention is stable in high temperature.

Although the invention has been described in detail with reference only to a preferred embodiment, those skilled in the art will appreciate that various modifications can be made without departing from the invention. Accordingly, the invention is defined only by the following claims which are intended to embrace all equivalent thereof.

What is claimed is:

1. A structure of a radiating fan comprising a blade seat, an axle and a hollow bearing, wherein the axle is made of precision ceramic material and installed in a center portion of the blade seat, the hollow bearing being self lubricating and made of precision ceramic material, the hollow bearing being located to enclose an outer peripheral surface of the axle, the hollow bearing having at least one annular groove formed in an inner peripheral surface of the bearing for reducing frictional contact area between the axle and the bearing.

2. The structure of a radiating fan as claimed in claim 1, wherein an outer peripheral surface of the axle has at least one annular groove formed therein.

3. The structure of a radiating fan as claimed in claim 1, wherein the precision ceramic material has a hardness greater than HK1200.

4. A structure of a radiating fan comprising a blade seat, an axle and a hollow bearing, wherein the axle is made of precision ceramic material and installed in a center portion of the blade seat, the hollow bearing being self lubricating and made of precision ceramic material, the hollow bearing being located to enclose a longitudinally extended portion of an outer peripheral surface of the axle, the hollow bearing having a plurality of longitudinally extended and angularly spaced trenches formed in an inner peripheral surface of the bearing for reducing frictional contact area between the axle and the bearing.

5. The structure of a radiating fan as claimed in claim 4, wherein the precision ceramic material has a hardness greater than HK1200.

* * * * *